United States Patent [19]

Fisher et al.

[11] 4,142,807
[45] Mar. 6, 1979

[54] SPLINED JOINT

[75] Inventors: Leslie G. Fisher, Birmingham; Ivor G. Sankey, Sutton Coldfield, both of England

[73] Assignee: GKN Transmissions Limited, Birmingham, United Kingdom

[21] Appl. No.: 840,563

[22] Filed: Oct. 11, 1977

[30] Foreign Application Priority Data

Apr. 16, 1977 [GB] United Kingdom ............... 15924/77

[51] Int. Cl.² .................................................. F16D 1/06
[52] U.S. Cl. ...................................... 403/13; 403/359; 29/432
[58] Field of Search ................. 403/359, 372, 371, 13, 403/14, 298; 64/23; 29/432, 525

[56] References Cited

U.S. PATENT DOCUMENTS 3,197,216  7/1965  Jackson ........................... 403/359 X
3,293,884  12/1966  Grob ................................ 64/23
3,374,015  3/1968  Gies ................................ 403/359
3,508,418  4/1970  Jones .............................. 403/359 X
3,588,154  6/1971  Voight ............................ 403/359 X

FOREIGN PATENT DOCUMENTS 1203245  8/1970  United Kingdom ..................... 403/13

Primary Examiner—Andrew V. Kundrat
Attorney, Agent, or Firm—Thomas M. Freiburger

[57] ABSTRACT

A splined joint between a shaft and a muff, for the purpose of preventing dog-legging has a chamber provided at the end of the muff from which the shaft projects and a guide ring received in such chamber, the guide ring being introduced axially into the chamber past an edge afforded by the muff which removes material from the guide ring to give the required clearance between the shaft and guide ring to constrain relative radial movement between the shaft and muff.

5 Claims, 2 Drawing Figures

U.S. Patent  Mar. 6, 1979  4,142,807
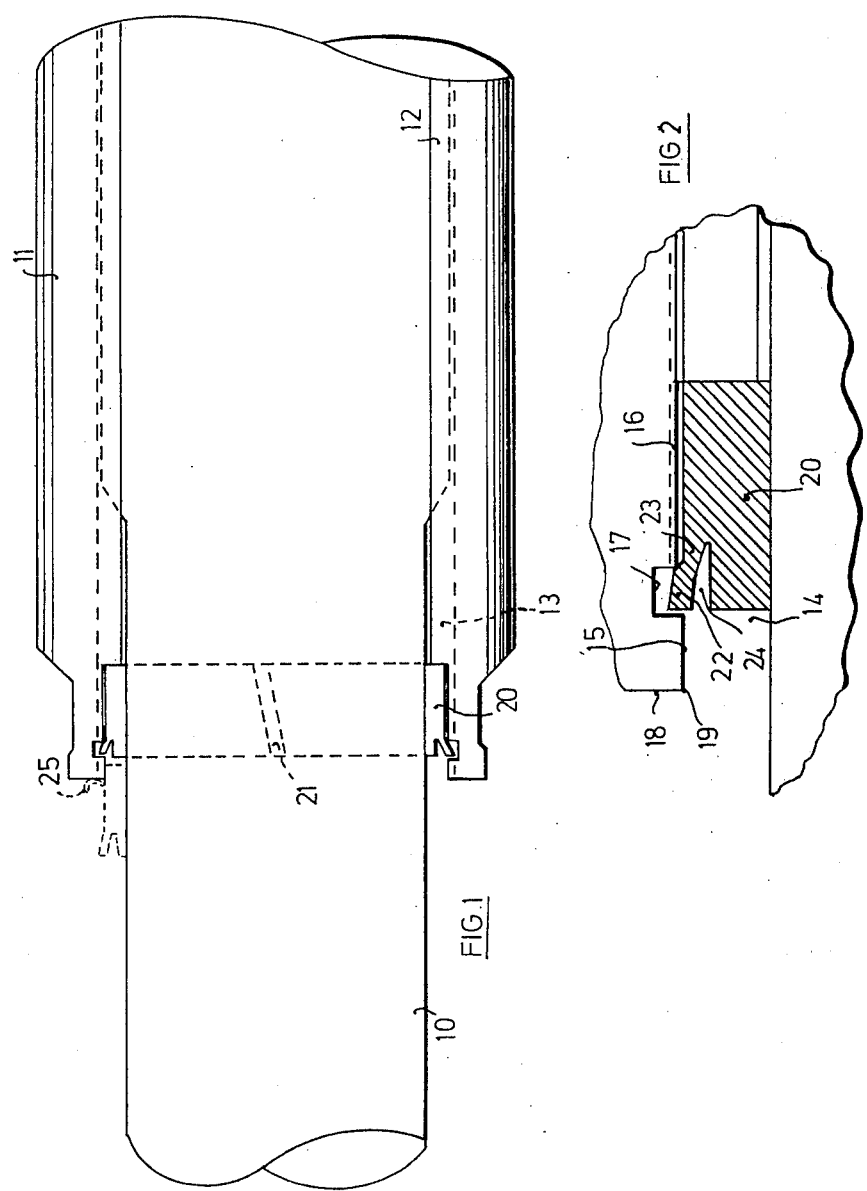

SPLINED JOINT

BACKGROUND OF THE INVENTION

Field of the invention

This invention relates to splined joints between rotary members, one of which is a male member (herein termed the shaft) and has a plurality of axially extending radially outwardly projecting teeth spaced apart angularly about the rotational axis of the shaft, and the other of which is a female member (herein called the "muff") and has a plurality of axially extending radially inwardly projecting teeth spaced apart angularly about the rotational axis of the muff, the teeth of each of these members fitting in the grooves between the teeth of the other member as a close sliding fit to permit of relative axial sliding movement between the members whilst torque is transmitted between them.

Such joints are hereinafter called splined joints of the kind specified.

SUMMARY OF THE INVENTION

One of the problems encountered in splined joints of the kind specified is known as "dog-legging". This means that, instead of being in axial alignment, the rotary axes of the shaft and muff take up an oblique relation due to clearances which exist initially or develop due to wear and tear between the teeth of one member and the grooves of the other.

The object of the present invention is to overcome or mitigate this disadvantage.

According to one aspect of the present invention, we provide a splined joint of the kind specified wherein the muff has an internal chamber adjacent the end from which the shaft projects and a guide ring is provided in said chamber, the guide ring is made of a material which can be ruptured, e.g. by shearing, and the muff is provided with a formation adapted to remove material from the guide ring during insertion of the guide ring axially into said chamber from said end, there being provided means for retaining the guide ring in position in the chamber once fitted.

Thus, in effect, the present invention provides that the required close engagement between the guide ring, the chamber in the muff, and the shaft is achieved by removal of material from the guide ring during axial insertion of the latter.

Preferably the means for retaining the guide ring in position in the chamber comprises a resilient formation on the guide ring engageable with an undercut recess in the muff, such formation on the guide ring being capable of yielding during insertion of the guide ring into the chamber so as not to be removed during this operation.

The chamber in the muff may include a first portion for performing said removal of material of the guide ring during axial insertion thereof, and a second portion inwardly of the first portion and of greater radial dimensions than the latter, the guide ring being accommodated wholly within said second portion when fully installed.

The effect of such provision is that the first portion of the chamber removes material from the guide ring during insertion of the latter, which subsequently expands when it enters the second portion of the chamber, the difference in dimensions between the first and second portions providing for control of the pressure exerted by the guide ring on the shaft, or for a running clearance.

According to a further aspect of the invention, a method of reducing dog-legging in a splined joint of the kind specified comprises providing a chamber at the end of the muff from which the shaft projects, said chamber having angularly spaced radially inwardly extending projections, providing a guide ring of rupturable material but of mechanical strength sufficient to exercise constraint upon relative radial movement between the shaft and the muff, inserting said guide ring into said chamber in an axial direction past an edge of said chamber, said edge removing material from the guide ring as the latter passes the edge, and securing said guide ring in position in said chamber.

BRIEF DESCRIPTION OF DRAWINGS

The invention will now be described, by way of example with reference to the accompanying drawings, of which:

FIG. 1 is a view in diametral cross-section of a splined joint of the kind specified in accordance with the invention, FIG. 2 is an enlargement of part of FIG. 1.

DESCRIPTION OF PREFERRED EMBODIMENT

Referring to the drawings, the illustrated splined joint comprises a male member or shaft 10 and a female member or muff 11, the former having radially outwardly projecting axially extending angularly spaced teeth 12 and the latter having radially inwardly projecting axially extending angularly spaced teeth 13 which define grooves between them.

Adjacent its open end, the muff 11 is counterbored to form a chamber 14, the chamber having a first portion bounded by a peripheral wall 15, the first portion being adjacent the free end of the muff. The wall 16 is undercut relative to the wall 15, that is to say has a greater average diameter, it being appreciated that both the walls 15 and 16 include the roots of teeth 13. Between the walls 15 and 16, the muff is formed with a groove 17 undercut to a greater depth, and the wall 15 meets a radially outwardly extending surface 18, which forms the end of the muff, in a sharp cutting edge 19.

Within the chamber 14 is disposed a guide ring 20, which is formed from a plastics material such as nylon 6, such material being capable of being ruptured and yet possessing a degree of resilience and the necessary mechanical strength. The guide ring 20 is split axially at 21, and has a cross-sectional shape which affords a lip 22 connected to the body of the guide ring by a relatively thin neck 23 and has its free end spaced from the main body of the guide ring by a gap 24. When the guide ring is properly installed in the muff as shown in FIG. 2 the end of the lip 22 abuts the wall of groove 17 to retain the guide ring in the larger diameter portion of chamber 14.

During assembly of the splined joint, the shaft 10 is introduced into the muff 11 and the guide ring 20 subsequently introduced into the chamber 14 from the open end of the muff. During this operation, the guide ring must pass the first portion of the chamber 14 which is of smaller diameter than the portion in which the ring ultimately is seated and the cutting edge 19 of the muff shears excess material from the ring 20 in the form of chips as shown at 25 in FIG. 1. The ring 20 is shown in broken lines in FIG. 1 in a position part way through its fitting operation. When the cutting edge 19 reaches the lip 22, this yields radially inwardly, closing the gap 24 so that the lip does not suffer any loss of material.

When the entire guide ring 20 has passed the wall 15, the lip 22 engages in the groove 17 to retain the guide ring against movement out of the chamber, the opposite end of the ring abutting the ends of the teeth 13 of the muff at the limit of the counterbore therein. Since the ring 20 now occupies the part of chamber 14 which is of greater mean diameter, the ring undergoes slight radial expansion, thereby relieving the pressure with which the ring 20 engages the shaft 10 and obviating the danger of the ring binding the shaft.

The ring 20 may initially have its outside circumference of smooth form, which is formed with grooves by the action of introducing the ring into the chamber 14. Alternatively, the ring may have protruding lands which are removed during the assembly process.

If desired, the chamber 14 need not have two portions of different dimensions, and the guide ring may be assembled in the manner above described, but with a removable shim, e.g. of a plastics material, disposed around the shaft in order to achieve the appropriate loading relationship between the guide ring and shaft.

We claim:

1. In a splined joint between a rotary shaft having a plurality of axially extending radially outwardly projecting teeth spaced apart angularly about the rotational axis of the shaft, and a muff or sleeve having a plurality of axially extending radially inwardly projecting teeth spaced apart angularly about the rotational axis of the muff, the teeth of each of these members fitting in the grooves between the teeth of the other member to provide for relative axial sliding movement and torque transmission between the members, with the shaft projecting outwardly from an end of the muff, said shaft and muff defining between them a generally annular chamber adjacent said end, the improvement comprising:
   a. a guide ring disposed in said chamber, so as to constrain relative radial movement between the shaft and that end of the muff, said guide ring being of a relatively rigid material for resisting said radial movement,
   b. means associated with the muff and the guide ring for establishing a measured close tolerance between the external surface of the guide ring and the internal surface of the muff, and
   c. means independent of the shaft for retaining the guide ring in position in the chamber.

2. A splined joint according to claim 1 wherein:
   a. the guide ring is provided with a radially outwardly extending resilient formation, such formation being yieldable inwardly during insertion of the guide ring into the chamber so as to not be removed from the guide ring during said insertion,
   b. the muff includes an undercut recess in the chamber therein, for receiving said resilient formation, and
   c. said material of which the guide ring is formed is rupturable, so that the resilient formation can be ruptured to remove the guide ring if desired.

3. A splined joint according to claim 1 wherein the muff defines a first portion of said chamber adjacent the free end thereof and a second portion inwardly of said frist portion and of greater radial dimension than the latter, the guide ring being accommodated wholly within said second portion when fully installed, said means for establishing a measured close tolerance comprising said guide ring having an initial outside diameter at least as large as said first chamber portion, so that after being forced into the second chamber portion, the guide ring has an outside diameter controlled by the diameter of said first portion.

4. A splined joint according to claim 3 wherein the radially inwardly projecting teeth of the muff extend into the chamber, being shorter therein than outside the chamber so that the teeth define the chamber, said teeth also defining said first and second portions of the chamber, being shorter in said second portion of the chamber than in the first.

5. A method of reducing dog-legging in a splined joint between a shaft and a muff or sleeve, comprising providing an enlarged-diameter chamber at the end of the muff from which the shaft projects, providing a guide ring of rupturable material but of mechanical strength sufficient to exercise constraint upon relative radial movement between the shaft and the muff, said ring initially having an outside diameter larger than the inside diameter of said chamber at an edge at the end of the muff, forcibly inserting said guide ring into said chamber after assembly of the shaft and the muff, in an axial direction past said edge of said chamber, said edge removing material from the outside surface of the guide ring as the latter passes the edge, so that the clearance of the guide ring in the chamber is closely controlled by the diameter of said edge, and securing said guide ring in position in said chamber.

* * * * *